(12) United States Patent
Kwon et al.

(10) Patent No.: US 12,157,370 B2
(45) Date of Patent: Dec. 3, 2024

(54) HYBRID POWERTRAIN FOR VEHICLE

(71) Applicants: Hyundai Motor Company, Seoul (KR); Kia Corporation, Seoul (KR)

(72) Inventors: Hyuk Joon Kwon, Suwon-si (KR); Ho Rim Yang, Yongin-si (KR); Buhm Joo Suh, Hwaseong-si (KR); Woul Sun Choi, Hwaseong-si (KR); Seung Wook Lee, Gwangmyeong-si (KR); Seok Joon Kim, Yongin-si (KR); Tal Chol Kim, Bucheon-si (KR); Yeong Il Choi, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 332 days.

(21) Appl. No.: 17/660,553

(22) Filed: Apr. 25, 2022

(65) Prior Publication Data

US 2023/0009105 A1    Jan. 12, 2023

(30) Foreign Application Priority Data

Jul. 7, 2021  (KR) .......................... 10-2021-0089248

(51) Int. Cl.
*B60K 6/40*  (2007.10)
*B60K 6/36*  (2007.10)
(Continued)

(52) U.S. Cl.
CPC .................. *B60K 6/40* (2013.01); *B60K 6/36* (2013.01); *B60K 6/387* (2013.01); *B60K 6/48* (2013.01);
(Continued)

(58) Field of Classification Search
CPC . B60K 6/40; B60K 6/36; B60K 6/387; B60K 6/48; B60K 6/547;
(Continued)

(56) References Cited

U.S. PATENT DOCUMENTS

2007/0243966 A1* 10/2007 Holmes .................. B60K 6/445
475/5
2009/0011887 A1* 1/2009 Komada ................ B60K 6/387
477/3
(Continued)

FOREIGN PATENT DOCUMENTS

DE    102019216213 A1 *  4/2021
FR       3058696 A1      5/2018
KR      102216067 B1     2/2021

OTHER PUBLICATIONS

Definition of Interlock and parallel (Year: 2020).*

Primary Examiner — Jacob S. Scott
Assistant Examiner — Farhana Pervin
(74) Attorney, Agent, or Firm — Slater Matsil, LLP

(57) ABSTRACT

An embodiment hybrid powertrain for a vehicle includes a first input shaft configured to be interlocked with an engine, a second input shaft configured to be interlocked with a first motor and to be parallel to the first input shaft, a third input shaft configured to be interlocked with a second motor and to be parallel to the second input shaft, an output shaft mounted parallel to the third input shaft, a first selective mesh device configured to transmit power from the second input shaft to the output shaft at multiple different gear ratios, a second selective mesh device configured to transmit the power from the third input shaft to the output shaft at the multiple different gear ratios, and a third selective mesh device configured to transmit the power from the first input shaft to the second input shaft or the third input shaft.

20 Claims, 10 Drawing Sheets

(51) Int. Cl.
  *B60K 6/387*  (2007.10)
  *B60K 6/48*  (2007.10)
  *B60K 6/547*  (2007.10)
  *F16H 3/00*  (2006.01)

(52) U.S. Cl.
  CPC ............. *B60K 6/547* (2013.01); *F16H 3/006* (2013.01); *B60K 2006/4816* (2013.01); *B60Y 2200/92* (2013.01); *F16H 2200/0078* (2013.01)

(58) Field of Classification Search
  CPC .... B60K 2006/4816; B60K 2006/4808; B60K 2006/4825; B60K 2006/4833; B60K 2006/4841; B60K 6/442; B60K 6/26; B60K 6/38; F16H 3/006; F16H 3/093; F16H 2003/0811; F16H 3/38; F16H 3/72; F16H 2200/0078; F16H 2200/0043; F16H 2200/2094; F16H 2200/2038; B60Y 2200/92; Y02T 10/62
  See application file for complete search history.

(56) References Cited

U.S. PATENT DOCUMENTS

| | | | |
|---|---|---|---|
| 2009/0170649 A1* | 7/2009 | Murakami | F16H 3/728 475/5 |
| 2010/0062891 A1* | 3/2010 | Ekonen | B60K 23/0808 74/405 |
| 2010/0078238 A1* | 4/2010 | Oba | B60W 10/08 180/65.225 |
| 2012/0021861 A1* | 1/2012 | Sakai | B60L 15/2054 903/910 |
| 2016/0144702 A1* | 5/2016 | Byun | F16H 3/006 180/65.23 |
| 2017/0305258 A1* | 10/2017 | Liu | B60K 6/365 |
| 2019/0337376 A1* | 11/2019 | Ore | B60K 6/365 |
| 2022/0153124 A1* | 5/2022 | Beck | B60K 6/442 |
| 2022/0185093 A1* | 6/2022 | Beck | B60K 6/387 |
| 2022/0250462 A1* | 8/2022 | Bayoux | B60K 6/44 |
| 2022/0252155 A1* | 8/2022 | Kawamoto | B60K 6/387 |
| 2022/0355657 A1* | 11/2022 | Kawamoto | B60K 6/40 |

* cited by examiner

FIG. 2

| Mode | SC1 | | SC2 | | SC3 | | Note |
|---|---|---|---|---|---|---|---|
| | L | R | L | R | L | R | |
| EV-1 | O | - | - | - | - | - | EV (DRIVING OF MG1) |
| EV-2 | - | O | - | - | - | - | |
| EV-3 | - | - | O | - | - | - | EV (DRIVING OF MG2) |
| EV-4 | - | - | - | O | - | - | |
| Two-EV-1 | O | - | O | - | - | - | Two-Motor EV |
| Two-EV-2 | O | - | - | O | - | - | |
| Two-EV-3 | - | O | O | - | - | - | |
| Two-EV-4 | - | O | - | O | - | - | |
| Series-1 | O | - | - | - | - | O | Series (DRIVING OF MG1) |
| Series-2 | - | O | - | - | - | O | |
| Series-3 | - | - | O | - | O | - | Series (DRIVING OF MG2) |
| Series-4 | - | - | - | O | O | - | |
| HEV1-1 | O | - | O | - | O | - | HEV1 UD |
| HEV1-2 | O | - | - | O | O | - | |
| HEV1-3 | O | - | - | - | O | - | |
| HEV2-1 | O | - | O | - | - | O | HEV2 UD |
| HEV2-2 | - | O | O | - | - | O | |
| HEV2-3 | - | - | O | - | - | O | |
| HEV3-1 | O | - | - | O | - | O | HEV3 OD |
| HEV3-2 | - | O | - | O | - | O | |
| HEV3-3 | - | - | - | O | - | O | |
| HEV4-1 | - | O | O | - | O | - | HEV4 OD |
| HEV4-2 | - | O | - | O | O | - | |
| HEV4-3 | - | O | - | - | O | - | |

HYBRID POWERTRAIN FOR VEHICLE

CROSS-REFERENCE TO RELATED APPLICATIONS

This application claims the benefit of Korean Patent Application No. 10-2021-0089248, filed on Jul. 7, 2021, which application is hereby incorporated herein by reference.

TECHNICAL FIELD

The present invention relates to a structure of a hybrid powertrain for a vehicle.

BACKGROUND

A hybrid powertrain for a vehicle is configured to appropriately combine the power generated by an engine and the power generated by a motor and transmit the power to drive wheels in order to improve the fuel efficiency of a vehicle.

It is preferable for a hybrid powertrain to have as few components as possible and to be capable of realizing a greater variety of driving modes suitable for the driving states of a vehicle.

The information disclosed in this Background section is only for enhancement of understanding of the general background of the invention, and should not be taken as an acknowledgement or any form of suggestion that this information forms the related art already known to a person skilled in the art.

SUMMARY

Therefore, embodiments of the present invention consider problems in the related art, and an embodiment of the present invention provides a hybrid powertrain for a vehicle, which is capable of realizing various driving modes with a comparatively simple construction, thereby improving the power performance and fuel efficiency of a vehicle, and which is capable of preventing interruption of transmission of power when switching between driving modes, thereby providing an improved gear-shifting sensation.

An embodiment of the present invention provides a hybrid powertrain for a vehicle, including a first input shaft mounted so as to be interlocked with an engine, a second input shaft mounted so as to be interlocked with a first motor and to be parallel to the first input shaft, a third input shaft mounted so as to be interlocked with a second motor and to be parallel to the second input shaft, an output shaft mounted parallel to the third input shaft, a first selective mesh device mounted so as to transmit power from the second input shaft to the output shaft at multiple different gear ratios, a second selective mesh device mounted so as to transmit power from the third input shaft to the output shaft at multiple different gear ratios, and a third selective mesh device mounted so as to transmit power from the first input shaft to the second input shaft or the third input shaft.

The hybrid powertrain may further include first and second gears mounted on the second input shaft so as to be non-rotatable relative to the second input shaft and third and fourth gears mounted on the output shaft so as to be rotatable relative to the output shaft and to mesh with the first and second gears, respectively. The first selective mesh device may connect one of the third and fourth gears to the output shaft.

The hybrid powertrain may further include fifth and sixth gears mounted on the output shaft so as to be non-rotatable relative to the output shaft and seventh and eighth gears mounted on the third input shaft so as to be rotatable relative to the third input shaft and to mesh with the fifth and sixth gears, respectively. The second selective mesh device may connect one of the seventh and eighth gears to the third input shaft.

The hybrid powertrain may further include a ninth gear mounted on the third input shaft so as to be non-rotatable relative to the third input shaft and tenth and eleventh gears mounted on the first input shaft so as to be rotatable relative to the first input shaft and to mesh with the second and ninth gears, respectively. The third selective mesh device may connect one of the tenth and eleventh gears to the first input shaft.

The third input shaft may be mounted so as to be interlocked with the second motor via the ninth gear and the eleventh gear in that order.

The hybrid powertrain may further include an idler gear meshing with the eleventh gear. The power from the second motor may be transmitted to the third input shaft via the idler gear.

The hybrid powertrain may further include an output gear mounted on the output shaft so as to be non-rotatable relative to the output shaft. The output gear may output power to a differential.

At least one of the first selective mesh device, the second selective mesh device, or the third selective mesh device may be implemented as a dog clutch.

At least one of the first selective mesh device, the second selective mesh device, or the third selective mesh device may be implemented as a synchromesh device.

BRIEF DESCRIPTION OF THE DRAWINGS

The above and other objects, features and other advantages of embodiments of the present invention will be more clearly understood from the following detailed description taken in conjunction with the accompanying drawings, in which:

FIG. 2 is a table showing the operating modes of the powertrain shown in FIG. 1;

DETAILED DESCRIPTION OF ILLUSTRATIVE EMBODIMENTS

Figure 1:
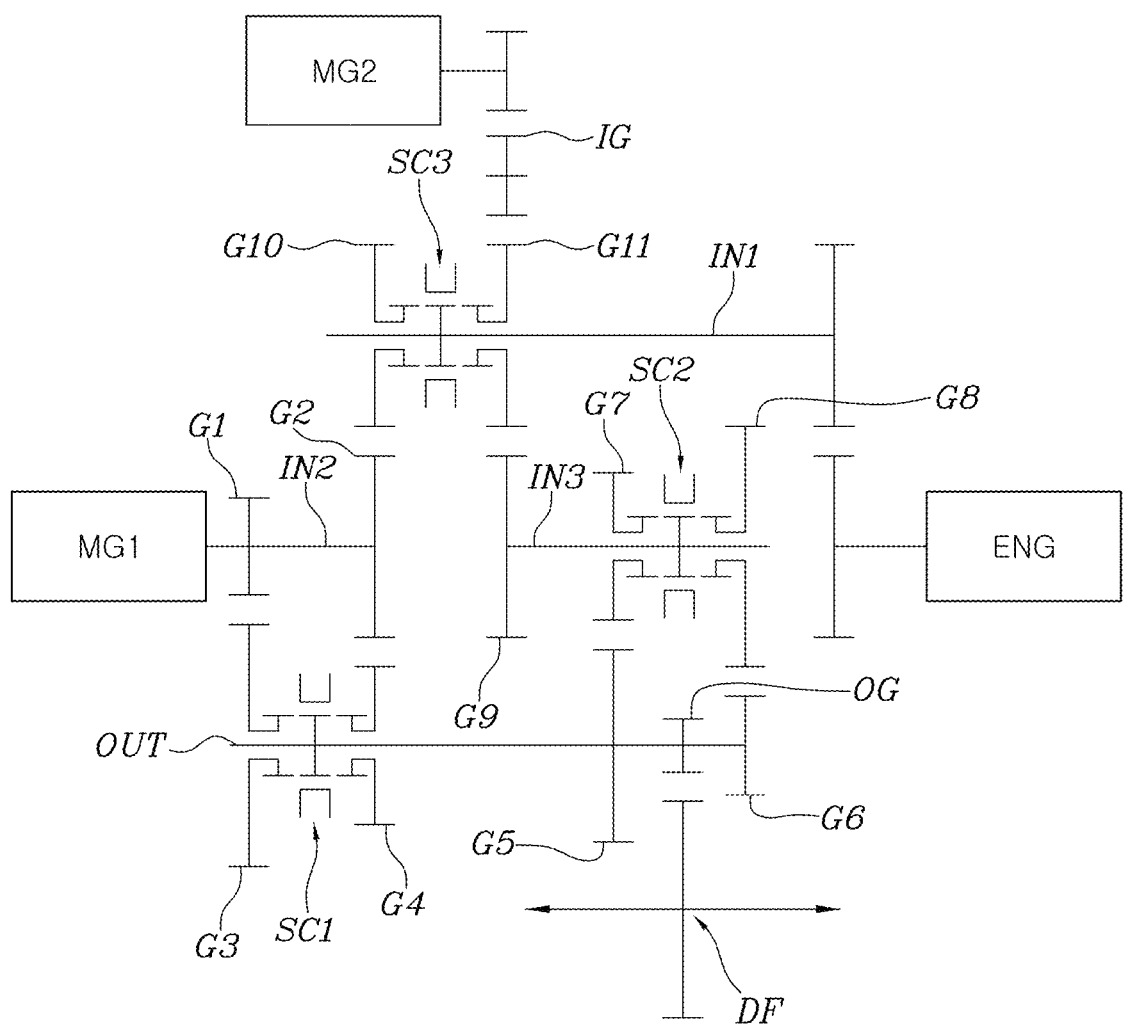
FIG. 1 is a view illustrating the structure of a hybrid powertrain for a vehicle according to an embodiment of the present invention.
Figure 3:
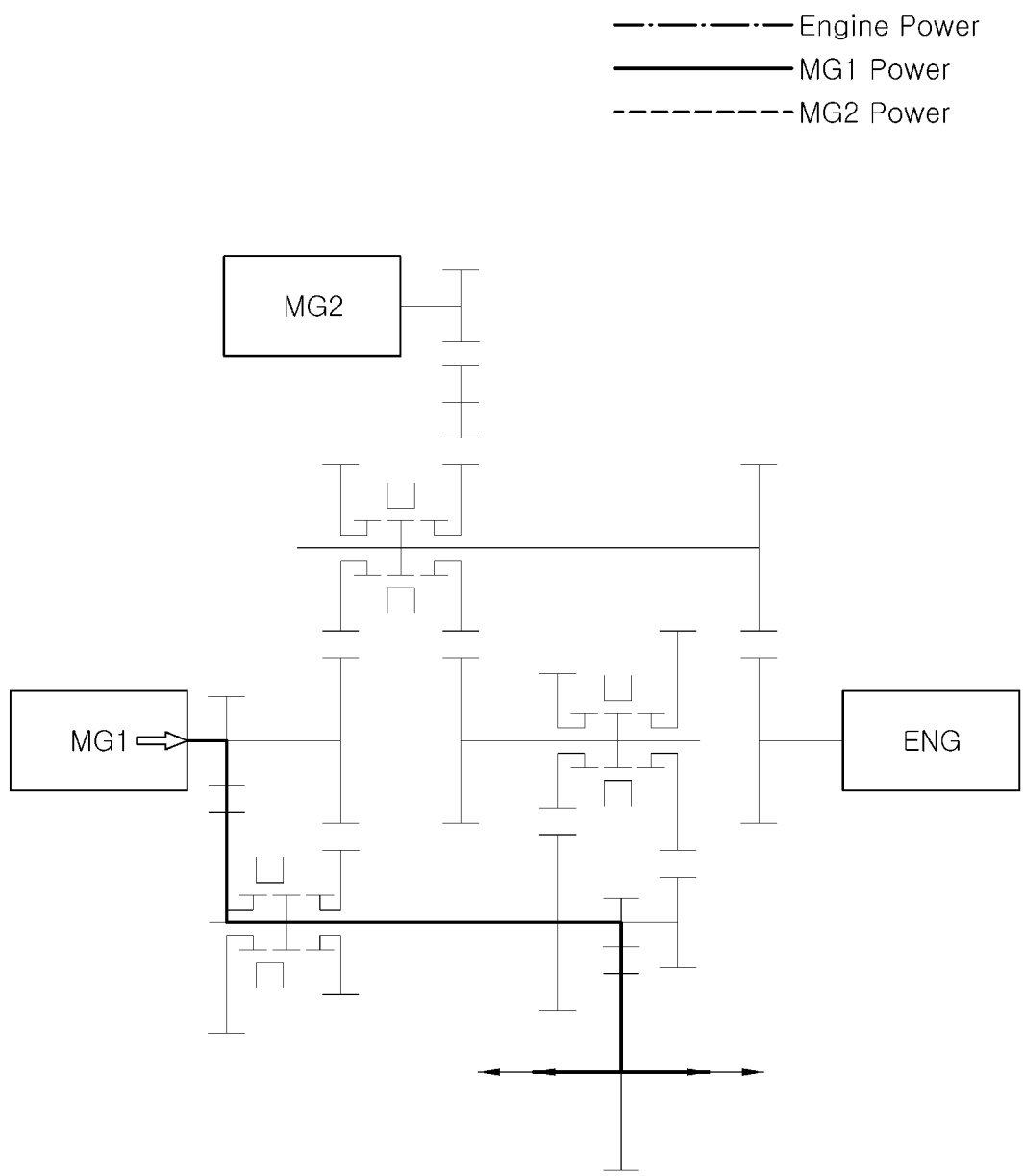
FIG. 3 is a view illustrating realization of an EV-1 mode in the operating mode table shown in FIG. 2.
Figure 4:
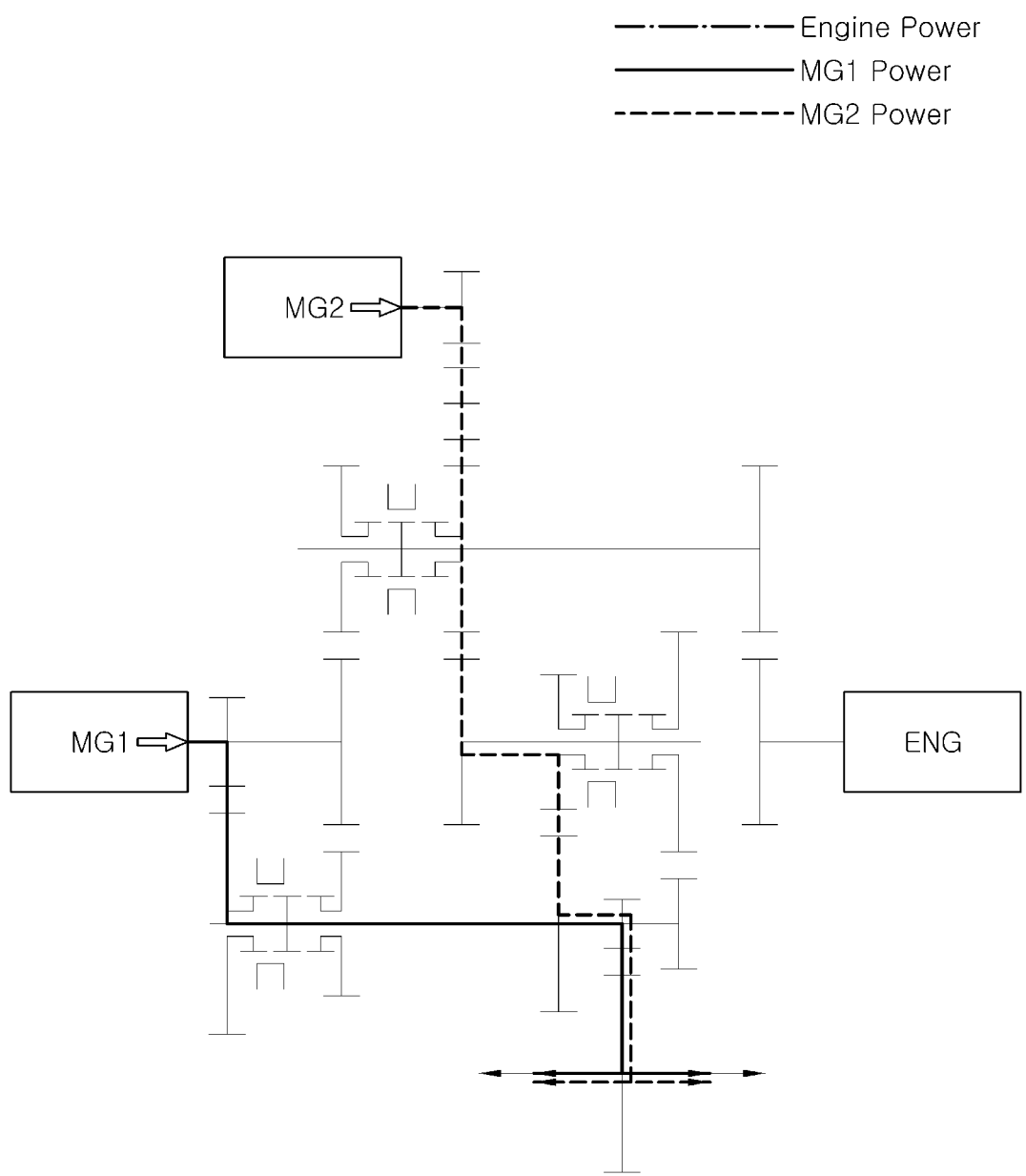
FIG. 4 is a view illustrating realization of a Two-EV-1 mode in the operating mode table shown in FIG. 2.
Figure 5:
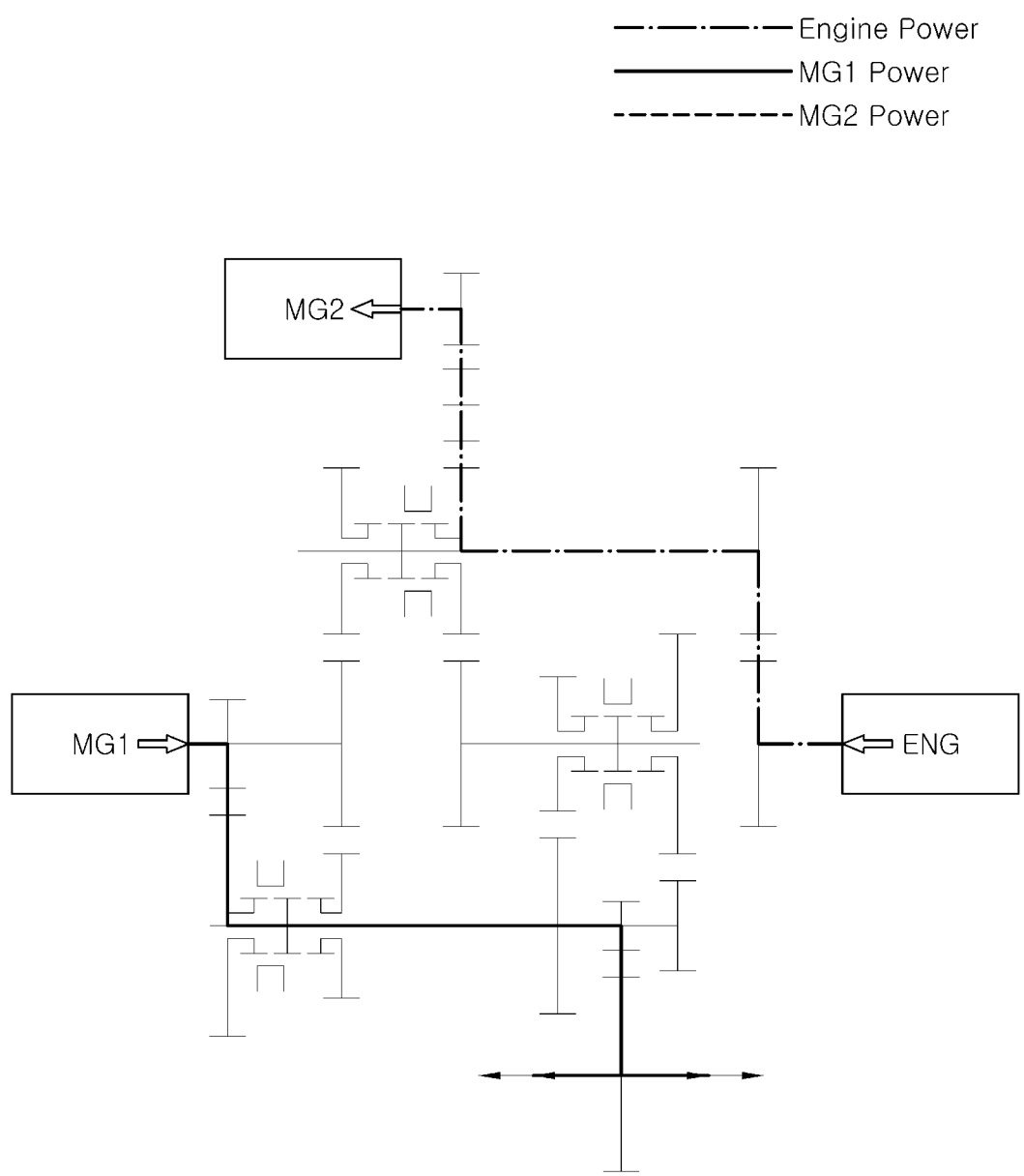
FIG. 5 is a view illustrating realization of a Series-1 mode in the operating mode table shown in FIG. 2.
Figure 6:
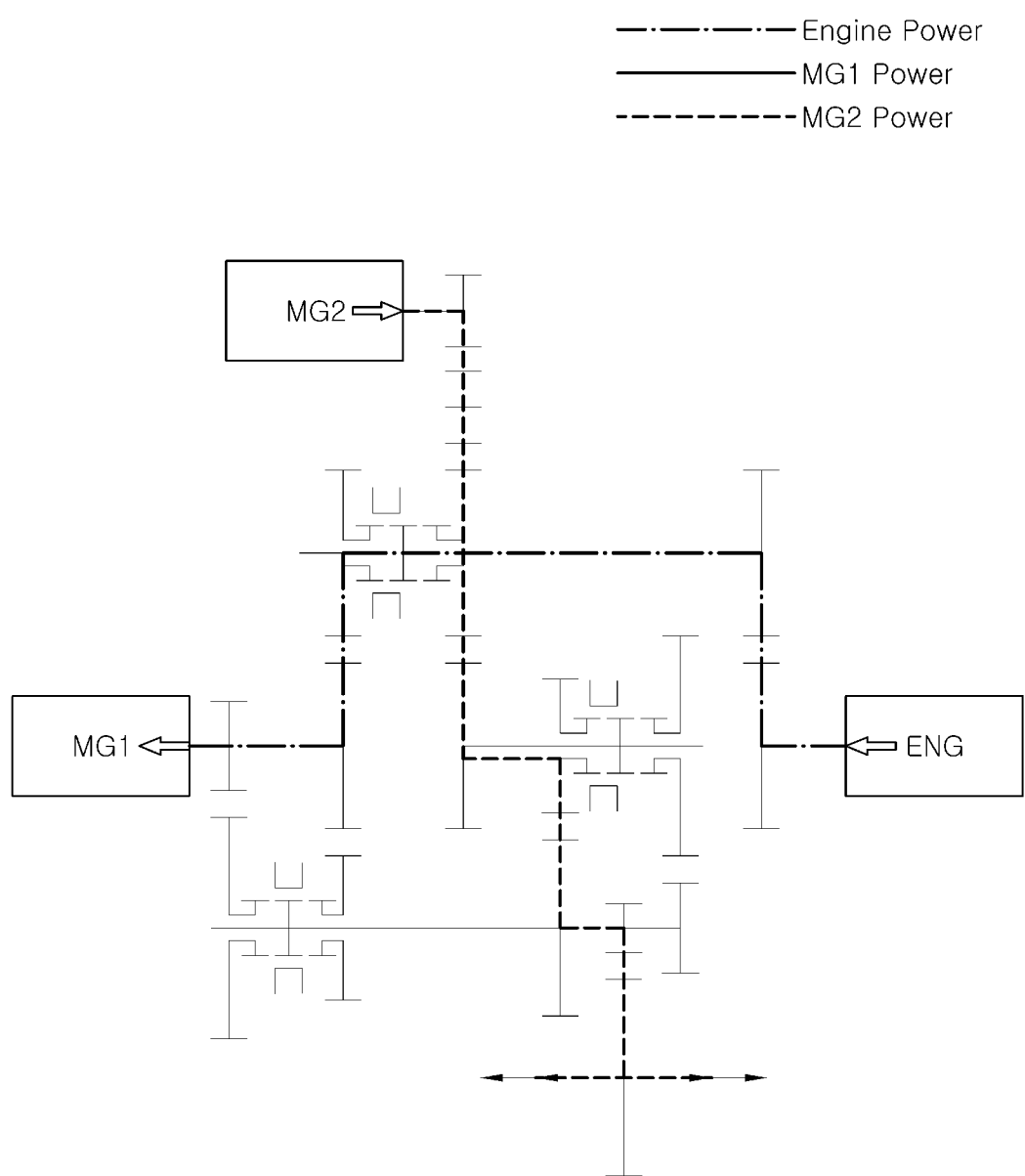
FIG. 6 is a view illustrating realization of a Series-3 mode in the operating mode table shown in FIG. 2.
Figure 7:
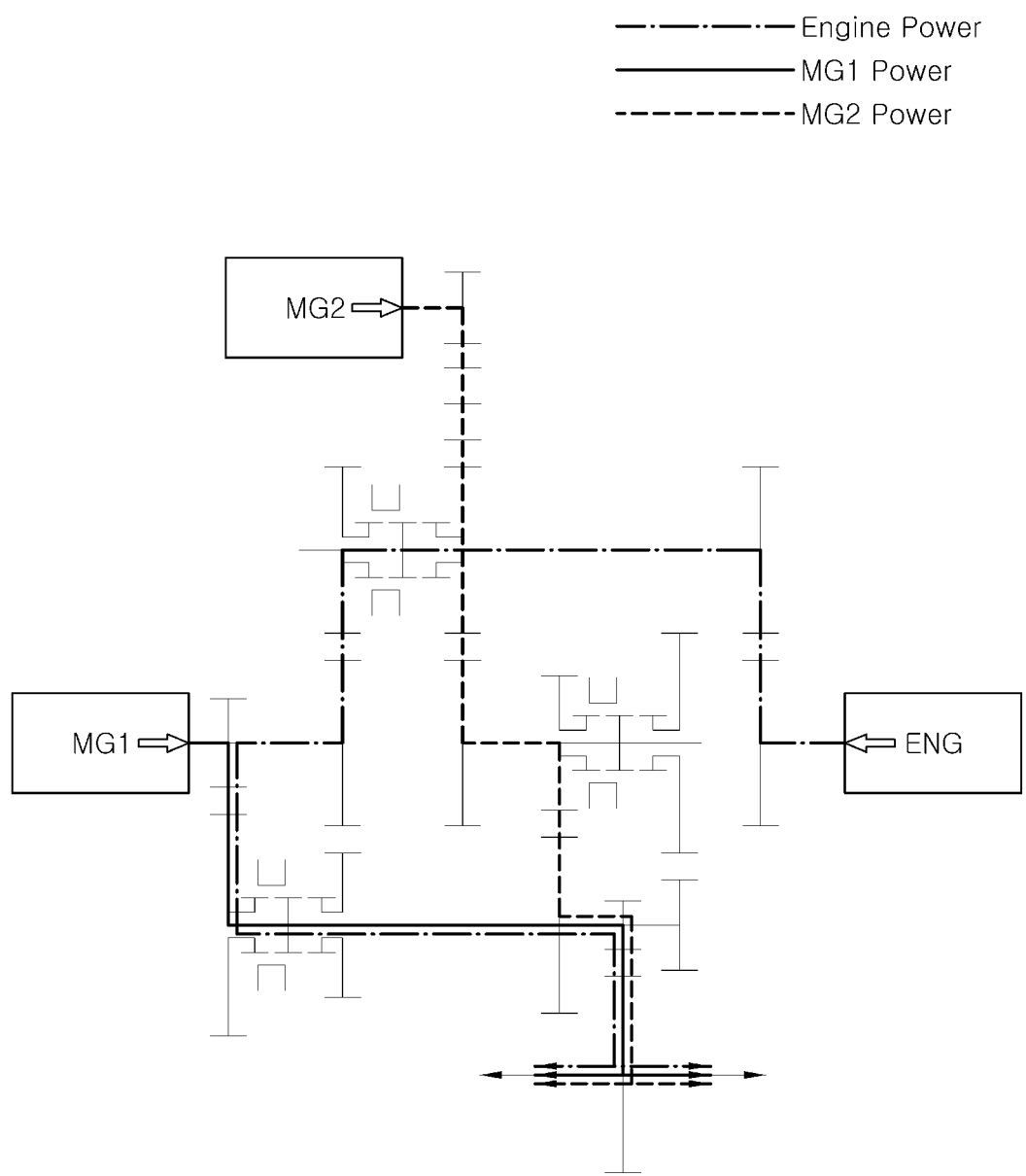
FIG. 7 is a view illustrating realization of an HEV1-1 mode in the operating mode table shown in FIG. 2.
Figure 8:
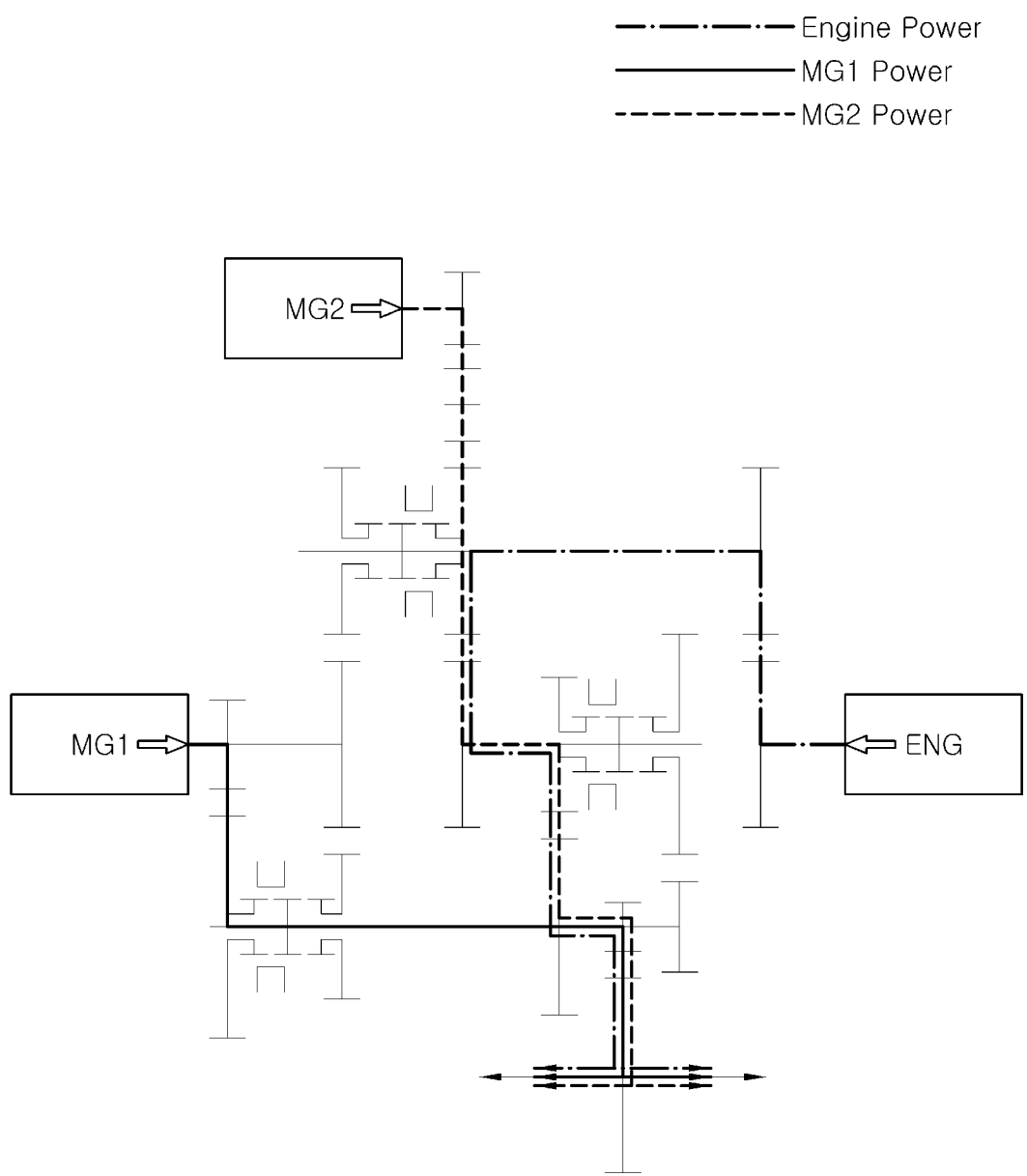
FIG. 8 is a view illustrating realization of an HEV2-1 mode in the operating mode table shown in FIG. 2.
Figure 9:
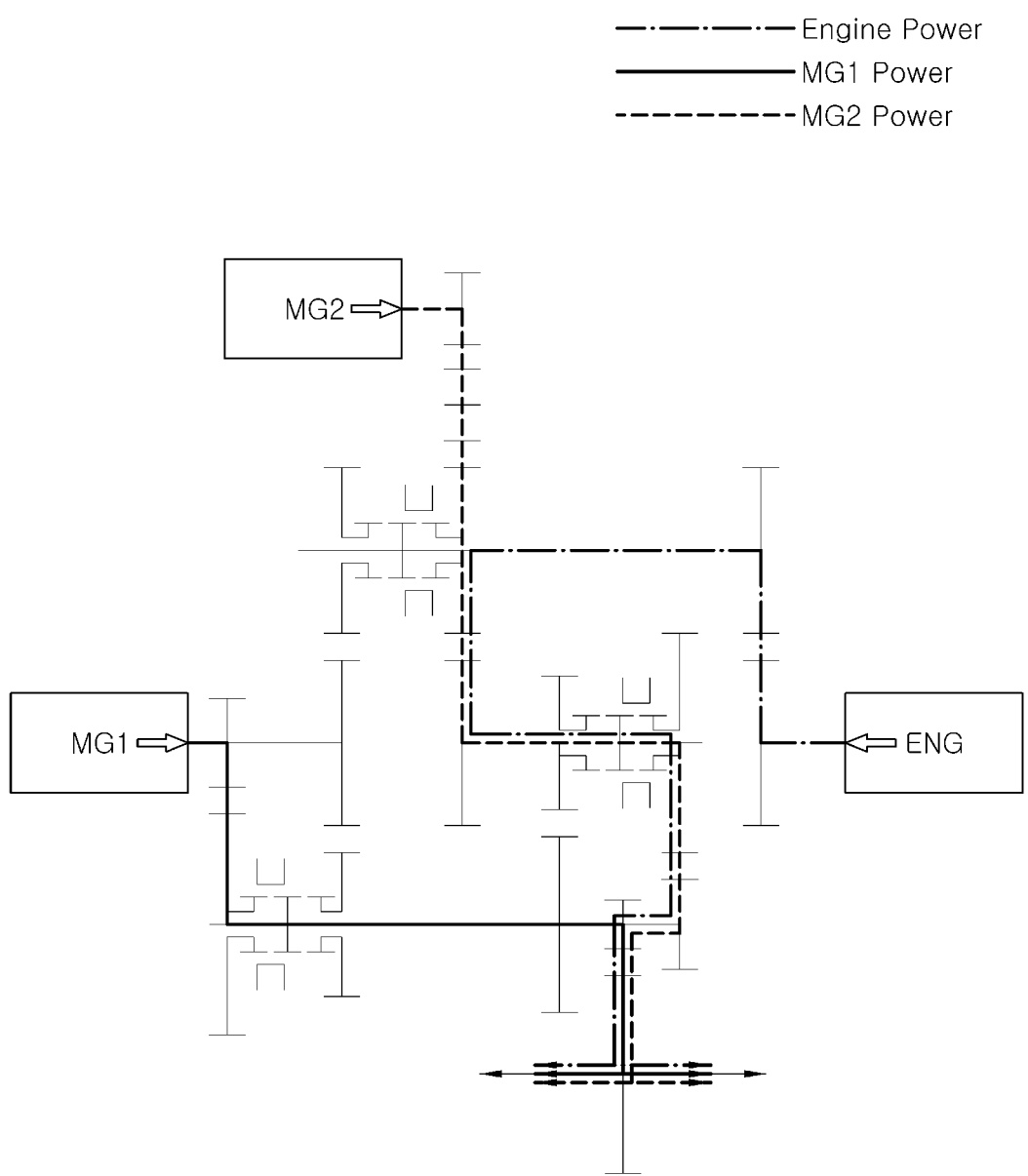
FIG. 9 is a view illustrating realization of an HEV3-1 mode in the operating mode table shown in FIG. 2.
Figure 10:
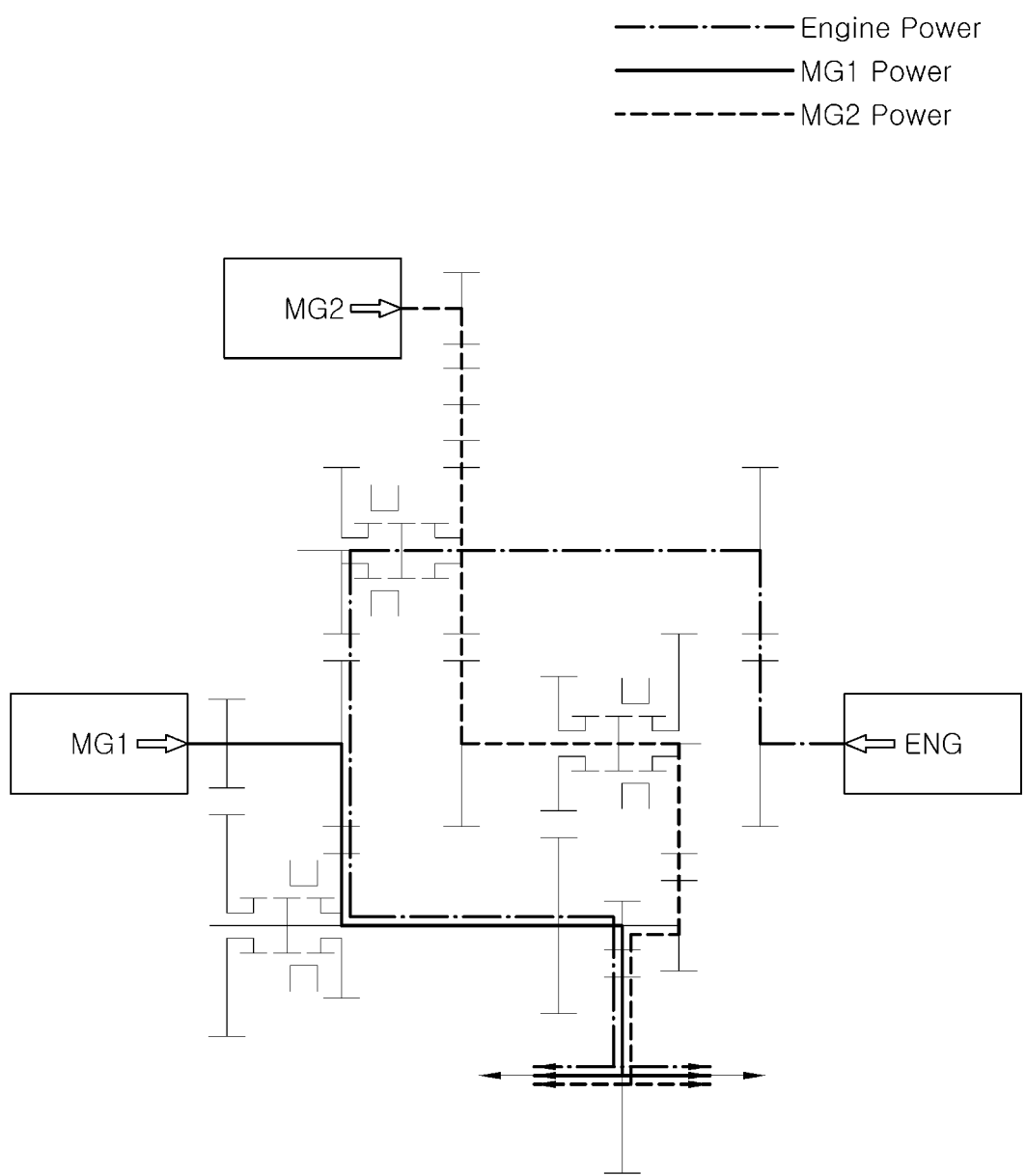
FIG. 10 is a view illustrating realization of an HEV4-2 mode in the operating mode table shown in FIG. 2.

Various exemplary embodiments will now be described more fully with reference to the accompanying drawings, in which only some exemplary embodiments are shown. Specific structural and functional details disclosed herein are merely representative for the purpose of describing exemplary embodiments. The present invention, however, may be embodied in many alternative forms, and should not be construed as being limited to the exemplary embodiments set forth herein.

Accordingly, while exemplary embodiments of the invention are capable of being variously modified and taking alternative forms, embodiments thereof are shown by way of example in the drawings and will herein be described in detail. It should be understood, however, that there is no intent to limit the present invention to the particular exemplary embodiments disclosed. On the contrary, exemplary embodiments are to cover all modifications, equivalents, and alternatives falling within the scope of the invention.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present invention.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the invention. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, exemplary embodiments of the present invention will be described in detail with reference to the accompanying drawings. In the drawings, the same reference numerals refer to the same components.

Referring to FIG. 1, a hybrid powertrain for a vehicle according to an embodiment of the present invention includes a first input shaft IN1, which is mounted so as to be interlocked with an engine ENG, a second input shaft IN2, which is interlocked with a first motor MG1 and is mounted parallel to the first input shaft IN1, a third input shaft IN3, which is interlocked with a second motor MG2 and is mounted parallel to the second input shaft IN2, an output shaft OUT, which is mounted parallel to the third input shaft IN3, a first selective mesh device SC1, which is mounted so as to transmit power from the second input shaft IN2 to the output shaft OUT at multiple different gear ratios, a second selective mesh device SC2, which is mounted so as to transmit power from the third input shaft IN3 to the output shaft OUT at multiple different gear ratios, and a third selective mesh device SC3, which is mounted so as to transmit power from the first input shaft IN1 to the second input shaft IN2 or the third input shaft IN3.

That is, the hybrid powertrain for a vehicle according to embodiments of the present invention is constructed such that the power transmitted from the engine ENG to the first input shaft IN1, the power transmitted from the first motor MG1 to the second input shaft IN2, and the power transmitted from the second motor MG2 to the third input shaft IN3 are transmitted to the output shaft OUT according to various combinations of meshing shown in FIG. 2, formed by the first selective mesh device SC1, the second selective mesh device SC2, and the third selective mesh device SC3, so as to realize a total of 24 driving modes.

For reference, in FIG. 2, "L" represents the state in which the sleeve of each selective mesh device meshes with a left gear based on FIG. 1, and "R" represents the state in which the sleeve of each selective mesh device meshes with a right gear based on FIG. 1.

A first gear G1 and a second gear G2 are mounted on the second input shaft IN2 so as to be non-rotatable relative to the second input shaft IN2, and a third gear G3 and a fourth gear G4 are mounted on the output shaft OUT so as to be rotatable relative to the output shaft OUT and to mesh with the first gear G1 and the second gear G2, respectively. The first selective mesh device SC1 serves to connect one of the third gear G3 and the fourth gear G4 to the output shaft OUT.

In other words, as illustrated in the drawings, the first motor MG1 is directly connected to the second input shaft IN2, the first gear G1 and the second gear G2 are mounted on the second input shaft IN2 so as to rotate together therewith, the third gear G3 meshes with the first gear G1, and the fourth gear G4 meshes with the second gear G2. Accordingly, when the first selective mesh device SC1 connects the third gear G3 to the output shaft OUT, the power supplied from the first motor MG1 to the second input shaft IN2 is transmitted to the output shaft OUT via the first gear G1 and the third gear G3. When the first selective mesh device SC1 connects the fourth gear G4 to the output shaft OUT, the power supplied to the second input shaft IN2 is transmitted to the output shaft OUT via the second gear G2 and the fourth gear G4.

A fifth gear G5 and a sixth gear G6 are mounted on the output shaft OUT so as to be non-rotatable relative to the output shaft OUT, and a seventh gear G7 and an eighth gear G8 are mounted on the third input shaft IN3 so as to be rotatable relative to the third input shaft IN3 and to mesh with the fifth gear G5 and the sixth gear G6, respectively. The second selective mesh device SC2 serves to connect one of the seventh gear G7 and the eighth gear G8 to the third input shaft IN3.

In other words, because the seventh gear G7 meshes with the fifth gear G5 and the eighth gear G8 meshes with the sixth gear G6, when the second selective mesh device SC2 connects the seventh gear G7 to the third input shaft IN3, the power supplied to the third input shaft IN3 is transmitted to the output shaft OUT via the seventh gear G7 and the fifth gear G5, and when the second selective mesh device SC2 connects the eighth gear G8 to the third input shaft IN3, the power supplied to the input shaft IN3 is transmitted to the output shaft OUT via the eighth gear G8 and the sixth gear G6.

A ninth gear G9 is mounted on the third input shaft IN3 so as to be non-rotatable relative to the third input shaft IN3, and a tenth gear G10 and an eleventh gear G11 are mounted on the first input shaft IN1 so as to be rotatable relative to the first input shaft IN1 and to mesh with the second gear G2, which is mounted so as to be non-rotatable relative to the second input shaft IN2, and the ninth gear G9, respectively. The third selective mesh device SC3 serves to connect one of the tenth gear G10 and the eleventh gear G11 to the first input shaft IN1.

In other words, the tenth gear G10 is mounted on the first input shaft IN1 so as to be rotatable relative to the first input shaft IN1 in the state of meshing with the second gear G2, and the eleventh gear G11 is mounted on the first input shaft IN1 so as to be rotatable relative to the first input shaft IN1 in the state of meshing with the ninth gear G9. Accordingly, when the third selective mesh device SC3 connects the tenth gear G10 to the first input shaft IN1, the power supplied to the first input shaft IN1 is transmitted to the second input shaft IN2 via the tenth gear G10 and the second gear G2. When the third selective mesh device SC3 connects the eleventh gear G11 to the first input shaft IN1, the power supplied to the first input shaft IN1 is transmitted to the third input shaft IN3 via the eleventh gear G11 and the ninth gear G9.

In the embodiment, the third input shaft IN3 is mounted so as to be interlocked with the second motor MG2 via the ninth gear G9 and the eleventh gear G11 in that order.

In other words, in the embodiment, when the second motor MG2 drives an idler gear IG, which meshes with the eleventh gear G11, the power from the second motor MG2 is transmitted to the third input shaft IN3 via the eleventh gear G11 and the ninth gear G9 in that order.

The idler gear IG may be provided as shown in the drawings in the case in which there is a need to secure a space between the second motor MG2 and the third selective mesh device SC3 or to increase a gear ratio. In another embodiment, however, the idler gear IG may be omitted.

In addition, an output gear OG for outputting power to a differential DF is mounted on the output shaft OUT so as to be non-rotatable relative to the output shaft OUT. Accordingly, the power supplied to the output shaft OUT is transmitted to the left and right drive wheels via the differential DF.

At least one of the first selective mesh device SC1, the second selective mesh device SC2, or the third selective mesh device SC3 may be implemented as a dog clutch.

Alternatively, at least one of the first selective mesh device SC1, the second selective mesh device SC2, or the third selective mesh device SC3 may be implemented as a synchromesh device.

In other words, as used herein, "selective mesh device" is meant to generally include a dog clutch and a synchromesh device. The synchromesh device may be a device employing a synchromesh-type mechanism in which a synchronizer ring is provided so that a sleeve and a clutch gear mesh with each other while carrying out a synchronizing action using frictional force, unlike a dog clutch.

It is advantageous to employ a dog clutch as the selective mesh device from the aspects of cost and weight, and the synchronizing action required for engagement of the dog clutch may be carried out by controlling the first motor MG1 or the second motor MG2.

The hybrid powertrain for a vehicle according to embodiments of the present invention configured as described above is capable of realizing 24 driving modes shown in FIG. 2, as mentioned above.

In FIG. 2, the term "EV" represents an electric vehicle mode in which only one of the first motor MG1 and the second motor MG2 is used to drive the vehicle, the term "Two-EV" represents an electric vehicle mode in which both the first motor MG1 and the second motor MG2 are used to drive the vehicle, the term "Series" represents a series mode in which the electric power generated by driving one of the first motor MG1 and the second motor MG2 using the power from the engine ENG is used to drive the other motor and the other motor is used to drive the vehicle, and the term "HEV" represents a hybrid mode in which the engine ENG and one of the first motor MG1 and the second motor MG2 are used together to drive the vehicle.

For reference, in the HEV mode shown in FIG. 2, the term "UD" represents an underdrive state in which the powertrain realizes a speed reduction ratio, and the term "OD" represents an overdrive state in which the powertrain realizes a speed increasing ratio.

FIGS. 3 to 10 illustrate states of realizing some representative driving modes among the 24 driving modes shown in FIG. 2. In the drawings, the flow of power is indicated by the arrows, and the sleeve of each of the selective mesh devices is illustrated as being in a neutral state in which the same is located in the middle, a state in which the same is meshed with a gear disposed on the left, or a state in which the same is meshed with a gear disposed on the right.

As is apparent from the above description, a hybrid powertrain for a vehicle according to embodiments of the present invention is capable of realizing various driving modes with a comparatively simple construction, thereby improving the power performance and fuel efficiency of a vehicle. In addition, embodiments of the present invention are capable of preventing interruption of transmission of power when switching between driving modes, thereby providing an improved gear-shifting sensation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hybrid powertrain for a vehicle, the hybrid powertrain comprising:
   a first input shaft configured to always receive power from an engine;
   a second input shaft configured always transfer the power to and from a first motor and to be parallel to the first input shaft;
   a third input shaft configured always transfer the power to and from a second motor and to be parallel to the second input shaft;
   an output shaft mounted parallel to the third input shaft;
   a first selective mesh device configured to transmit the power from the second input shaft to the output shaft at multiple different gear ratios;
   a second selective mesh device configured to transmit the power from the third input shaft to the output shaft at the multiple different gear ratios; and
   a third selective mesh device configured to selectively transmit the power from the first input shaft to the second input shaft and the third input shaft.

2. The hybrid powertrain according to claim 1, further comprising:
  a first gear and a second gear mounted on the second input shaft and configured to be non-rotatable relative to the second input shaft; and
  a third gear and a fourth gear mounted on the output shaft and configured to be rotatable relative to the output shaft and to mesh with the first gear and the second gear, respectively, wherein the first selective mesh device is configured to connect the third gear or the fourth gear to the output shaft.

3. The hybrid powertrain according to claim 2, further comprising:
  a fifth gear and a sixth gear mounted on the output shaft and configured to be non-rotatable relative to the output shaft; and
  a seventh gear and an eighth gear mounted on the third input shaft and configured to be rotatable relative to the third input shaft and to mesh with the fifth gear and the sixth gear, respectively, wherein the second selective mesh device is configured to connect the seventh gear or the eighth gear to the third input shaft.

4. The hybrid powertrain according to claim 3, further comprising:
  a ninth gear mounted on the third input shaft and configured to be non-rotatable relative to the third input shaft; and
  a tenth gear and an eleventh gear mounted on the first input shaft and configured to be rotatable relative to the first input shaft and to mesh with the second gear and the ninth gear, respectively, wherein the third selective mesh device is configured to connect the tenth gear or the eleventh gear to the first input shaft.

5. The hybrid powertrain according to claim 4, wherein the third input shaft is configured to be interlocked with the second motor via the ninth gear and the eleventh gear in that order.

6. The hybrid powertrain according to claim 5, further comprising an idler gear configured to mesh with the eleventh gear, wherein the idler gear is configured to transmit the power from the second motor to the third input shaft.

7. The hybrid powertrain according to claim 4, further comprising an output gear mounted on the output shaft and configured to be non-rotatable relative to the output shaft, wherein the output gear is configured to output the power to a differential.

8. The hybrid powertrain according to claim 1, wherein the first selective mesh device, the second selective mesh device, or the third selective mesh device is a dog clutch.

9. The hybrid powertrain according to claim 1, wherein the first selective mesh device, the second selective mesh device, or the third selective mesh device is a synchromesh device.

10. A vehicle comprising:
  a vehicle body;
  an engine mounted in the vehicle body;
  a first motor mounted in the vehicle body;
  a second motor mounted in the vehicle body; and
  a powertrain device mounted in the vehicle body, the powertrain device comprising:
    a first input shaft installed to always receive power from the engine;
    a second input shaft installed to always transfer the power to and from the first motor and parallel to the first input shaft;
    a third input shaft installed to always transfer the power to and from the second motor and parallel to the second input shaft;
    an output shaft mounted parallel to the third input shaft;
    a first selective mesh device configured to transmit the power from the second input shaft to the output shaft at multiple different gear ratios;
    a second selective mesh device configured to transmit the power from the third input shaft to the output shaft at the multiple different gear ratios; and
    a third selective mesh device configured to selectively transmit the power from the first input shaft to the second input shaft and the third input shaft.

11. The vehicle according to claim 10, further comprising:
  a first gear and a second gear mounted on the second input shaft and configured to be non-rotatable relative to the second input shaft; and
  a third gear and a fourth gear mounted on the output shaft and configured to be rotatable relative to the output shaft and to mesh with the first gear and the second gear, respectively, wherein the first selective mesh device is configured to connect the third gear or the fourth gear to the output shaft.

12. The vehicle according to claim 11, further comprising:
  a fifth gear and a sixth gear mounted on the output shaft and configured to be non-rotatable relative to the output shaft;
  a seventh gear and an eighth gear mounted on the third input shaft and configured to be rotatable relative to the third input shaft and to mesh with the fifth gear and the sixth gear, respectively, wherein the second selective mesh device is configured to connect the seventh gear or the eighth gear to the third input shaft;
  a ninth gear mounted on the third input shaft and configured to be non-rotatable relative to the third input shaft; and
  a tenth gear and an eleventh gear mounted on the first input shaft and configured to be rotatable relative to the first input shaft and to mesh with the second gear and the ninth gear, respectively, wherein the third selective mesh device connects the tenth gear or the eleventh gear to the first input shaft.

13. The vehicle according to claim 12, wherein the third input shaft is configured to be interlocked with the second motor via the ninth gear and the eleventh gear in that order.

14. The vehicle according to claim 13, further comprising an idler gear configured to mesh with the eleventh gear, wherein the idler gear is configured to transmit the power from the second motor to the third input shaft.

15. The vehicle according to claim 12, further comprising an output gear mounted on the output shaft and configured to be non-rotatable relative to the output shaft, wherein the output gear is configured to output the power to a differential.

16. The vehicle according to claim 10, wherein the first selective mesh device, the second selective mesh device, or the third selective mesh device is a dog clutch.

17. The vehicle according to claim 10, wherein the first selective mesh device, the second selective mesh device, or the third selective mesh device is a synchromesh device.

18. A method of providing a hybrid powertrain for a vehicle, the method comprising:
  interlocking a first input shaft with an engine for a constant connection;
  interlocking a second input shaft with a first motor for a constant connection, the second input shaft being parallel to the first input shaft;

interlocking a third input shaft with a second motor for a constant connection, the third input shaft being parallel to the second input shaft;

mounting an output shaft parallel to the third input shaft;

transmitting power from the second input shaft to the output shaft at multiple different gear ratios using a first selective mesh device;

transmitting the power from the third input shaft to the output shaft at the multiple different gear ratios using a second selective mesh device; and transmitting the power from the first input shaft to the second input shaft and the third input shaft selectively using a third selective mesh device.

19. The method according to claim 18, further comprising:

mounting a first gear and a second gear on the second input shaft, wherein the first gear and the second gear are non-rotatable relative to the second input shaft;

mounting a third gear and a fourth gear on the output shaft, wherein the third gear and the fourth gear are rotatable relative to the output shaft and mesh with the first gear and the second gear, respectively;

connecting the third gear or the fourth gear to the output shaft using the first selective mesh device;

mounting a fifth gear and a sixth gear on the output shaft, wherein the fifth gear and the sixth gear are non-rotatable relative to the output shaft;

mounting a seventh gear and an eighth gear on the third input shaft, wherein the seventh gear and the eighth gear are rotatable relative to the third input shaft and mesh with the fifth gear and the sixth gear, respectively;

connecting the seventh gear or the eighth gear to the third input shaft using the second selective mesh device;

mounting a ninth gear on the third input shaft, wherein the ninth gear is non-rotatable relative to the third input shaft;

mounting a tenth gear and an eleventh gear on the first input shaft, wherein the tenth gear and the eleventh gear are rotatable relative to the first input shaft and mesh with the second gear and the ninth gear, respectively; and connecting the tenth gear or the eleventh gear to the first input shaft using the third selective mesh device.

20. The method according to claim 18, wherein the first selective mesh device, the second selective mesh device, or the third selective mesh device is a dog clutch or a synchromesh device.

* * * * *